(12) United States Patent
Williames (10) Patent No.: US 6,237,286 B1
(45) Date of Patent: May 29, 2001

(54) NURSERY TRAYS AND HANDLING MECHANISMS THEREFOR (75) Inventor: Geoffrey Allan Williames, Warragul (AU)

(73) Assignee: Williames Hi-Tech International Pty Ltd., Victoria (AU)

( * ) Notice: Subject to any disclaimer, the term of this patent is extended or adjusted under 35 U.S.C. 154(b) by 0 days.

(21) Appl. No.: 09/254,614
(22) PCT Filed: Sep. 11, 1997
(86) PCT No.: PCT/AU97/00596
  § 371 Date: May 28, 1999
  § 102(e) Date: May 28, 1999
(87) PCT Pub. No.: WO98/10990
  PCT Pub. Date: Mar. 19, 1998

(30) Foreign Application Priority Data

Sep. 11, 1996 (AU) .................................................. PO 2231

(51) Int. Cl.[7] ....................................................... A01G 9/10
(52) U.S. Cl. ...................................... 47/66.5; 47/77; 47/87
(58) Field of Search ............................... 47/1.01 R, 66.5, 47/73, 77, 86, 87; 198/867.14, 803.2

(56) References Cited

U.S. PATENT DOCUMENTS

| | | | |
|---|---|---|---|
| 3,561,158 | * | 2/1971 | Marcan .................................... 47/87 |
| 4,196,561 | * | 4/1980 | Kruse ................................ 198/803.2 |
| 4,389,814 | * | 6/1983 | Andreason et al. ..................... 47/73 |
| 4,694,950 | * | 9/1987 | Macleod, Jr. ...................... 198/803.2 |
| 4,769,946 | * | 9/1988 | de Groot et al. ......................... 47/73 |
| 4,778,045 | * | 10/1988 | Grune et al. ..................... 198/867.14 |
| 5,274,953 | * | 1/1994 | Nicholson ................................ 47/87 |
| 6,085,462 | * | 7/2000 | Thomas .................................. 47/87 |

FOREIGN PATENT DOCUMENTS

| | | | |
|---|---|---|---|
| 3404300 A1 | * | 8/1985 | (DE). |
| 0254434 | * | 1/1988 | (EP). |
| 8-196150 | * | 8/1996 | (JP). |

* cited by examiner

*Primary Examiner*—Robert P. Swiatek
(74) *Attorney, Agent, or Firm*—Reising, Ethington, Barnes, Kisselle, Learman & McCulloch, P.C.

(57) ABSTRACT

The present invention relates to an improved nursery tray and apparatus for handling such a nursery tray during propagating and growing periods, the tray (10) comprising a plurality of cells (18) in a predetermined array having two opposed side walls (14, 15) and two opposed end walls (16, 17), the tray being characterized by a plurality of spaced slots (28) located in opposed walls (14, 15, 16, 17) with each slot (28) being aligned with a space between two of said cells (18) and each slot (28) having an open end at a lower edge of the walls (14, 15, 16, 17) in which the slots are formed, the apparatus for handling such trays being characterized by support members (40) interconnected by chains (46) into an endless configuration capable of being driven by drive means (42) such that the support members move along guideways (41), the support members (40) each having at least one elevated tray engagement part (45) configured to engage in tray edge formations such as the slots (28) to support the trays in a manner preventing obstruction of their lower faces.

37 Claims, 10 Drawing Sheets

NURSERY TRAYS AND HANDLING MECHANISMS THEREFOR

The present invention relates to improvements in nursery trays having individual cells for propagating and growing seedlings to a stage requiring transplanting into other larger containers or into a ground position, the nursery trays being configured so as to enable automation of their handling, particularly during the transplanting stage. Conveniently, the present invention also relates to improvements in nursery tray handling mechanisms.

BACKGROUND OF THE INVENTION

There have been a number of attempts in the past to provide nursery tray configurations that can be readily indexed through a transplanting mechanism. One such attempt required the total removal of side walls from the tray thereby allowing indexing to be achieved off the edges of the entire row of individual cells in the longitudinal direction of the cell. While this tray has been used, it does suffer from a number of practical problems including a lack of strength caused by the removal of the side walls and the fact that the trays readily nested one into the other causing significant de-stacking problems with automated machinery. Further, the lack of strength caused size limitations and for all the foregoing reasons, this type of tray has not been popular in the nursery industry.

A further attempt to enable convenient tray indexing involved using a side wall rack along the length of the tray wall. This type of tray necessarily meant that the cells around the outer edge of the tray were dissimilar in dimensional size to the other cells. This unfortunately retards growth in the outer cells. Indexing along the length of the tray also significantly decreases the overall longitudinal strength of the tray or reduces the depth of the engaging means causing ineffective indexing.

A still further method of indexing utilised in the past used parallel slots running the entire length of the tray underneath the tray. This arrangement has the effect of overall weakening thus minimising tray strength and breakaway sections at the base cells of the tray can often occur. Nursery trays are commonly treated relatively harshly in use and any weakening of the aforementioned kind results in a greatly lessened useful life for the trays. The breakaway sections of the tray should they occur also can cause an entrapment of roots thus making plant ejection difficult.

A still further proposal for indexing trays of this type suggested in the past is to provide trays with side walls having a plurality of evenly spaced enclosed apertures along their length to provide a basis for engagement with an indexing mechanism. Unfortunately, such trays have required complex indexing mechanisms and moreover, have not readily provided a means for utilising a simple indexing mechanism to index a plurality of adjacently positioned trays in a continuous indexing process.

There are also certain other difficulties that need to be considered when providing a nursery tray configured for a continuous indexing process. The trays themselves are produced from moulded plastics and it has been found that currently available trays (of the same type) can vary up to six mm in longitudinal length. This may be due to thermal expansion, poor die quality or ratios of various plastics and fillers batch to batch, but for whatever reason, such variations make it very difficult to obtain complete engagement and accuracy with the indexing mechanism. Furthermore, with trays of the type including apertures in the side wall, the variation of tray length causes particular problems with indexing mechanism engagement. Other aspects that commonly occur with tray usage is tray corner damage as a result of trays being dropped on their corners in general day to day use. Most currently available trays have a marked lack of reinforcement on the corners and ends of the trays where most impacts occur.

Additionally, in the nursery industry, the main means to support trays has been by the use of a T-Bar mechanism whereby the trays sit on the bottom flange of an inverted T-Bar. This type of structure renders severe root growth problems with at least the end cells of the tray actually sitting on the T-Bar flange. The problem would be worse in any facility where the tray is allowed to sit on a solid or semi-solid surface for any length of time during the growth of seedlings in the tray. It is a common phenomenon for root growth to pass through the open lower end of the cell and form an intertwining mat beneath the cells when there is no clear air space between the cell bottoms and an underlying surface. There may, in such circumstances be little root growth actually within the cell due to the vigour of the plant root growth being expended outside of the cell. This causes problems in ejecting the seedlings from the cells during transplanting and moreover, could result in a seedling being transplanted with little or no root mass as a result of most of the root mass being left below the tray.

In a related aspect, the present invention aims at providing a nursery system that can enable trays to be readily handled during growing phases of seedlings within the tray without causing substantial root growth outside the cell which is controlled by exposure to air (aerial pruning) but which can also be used conveniently in an automatic transplanting mechanism. During seedling growth phases, it might be desired for a nursery to support many nursery trays in a manner whereby they can be moved between various conditions such as full sun, full shade, part shade and perhaps through a watering zone or from the growing area to loading/dispatch zone. As noted above, currently available nursery systems normally support nursery trays on at least flat surfaces along their edges, if not over their full base regions, and are normally moved manually or semi-manually between different areas.

The objective therefore of the present invention is to provide an improved nursery tray and a method of moving or indexing such trays which will meet some or all of the aforementioned difficulties associated with conventional nursery trays. In accordance with a related aspect, the present invention also aims at providing a novel arrangement for handling nursery trays during growth phases for seedlings grown in the trays.

SUMMARY OF THE INVENTION

According to a first aspect of the present invention, there is provided a nursery tray having a plurality of cells in a predetermined array with each cell having an open upper face of the cells and an opening in a lower face of the cell, said nursery tray having two opposed side walls and two opposed end walls, said tray being characterised by at least one of said walls having a plurality of spaced slots with each said slot being aligned with a space between two of said cells and each said slot having an open end at a lower edge of said at least one wall. Conveniently said slots are uniformly spaced and located such that when two or more of said nursery trays are positioned adjacent one another, the slots are uniformly spaced along the wall configuration formed by the adjacent said at least one wall. Preferably, the aforesaid slots are located in both opposed end walls or both opposed side walls or in all four of the side and end walls. It is most preferred that the slots are located in both opposed end walls. Conveniently, one said slot is provided for each said space between adjacent cells located along the relevant end or side wall.

Conveniently, the outer wall thickness of at least the two opposed side walls is half that of the distance separating internal rows of cells. The effect of this is that when a series of trays are indexed adjacent one another, the centre distance of the last row of cells in the first tray to the centre distance to the first row of cells in the second tray is equal to the centre distance between successive rows of cells across the trays thus allowing for continuous further indexing.

In accordance with a further aspect of the present invention, a nursery tray is provided having a plurality of cells in a predetermined array with each said cell having an open upper face, cell wall means converging toward a lower face of the cell, and an opening in said lower face of each said cell, said nursery tray further having two opposed end walls and two opposed side walls, said nursery tray being further characterised by:
(i) said end walls having a plurality of slots with each said slot being aligned with a space between a respective two of said cells and each said slot having an open end at a lower edge of said end walls;
(ii) a lower edge of said side walls depending below the lower edge of said end walls;
(iii) at least one stiffening rib extending through said cell array generally parallel to said side walls having a lower edge coplanar with the lower edges of said side walls; and
(iv) the openings in said lower face of the cells being located above the lower edges of said side walls and said at least one stiffening rib.

In accordance with a variation of the further aspect disclosed in the preceding paragraph, the present invention also provides a nursery tray having a plurality of cells in a predetermined array with each said cell having an open upper face, cell wall means converging toward a lower face of the cell, and an opening in said lower face of each said cell, said nursery tray further having two opposed end walls and two opposed side walls, said nursery tray being further characterised by:
(i) said side walls having a plurality of slots with each said slot being aligned with a space between a respective two of said cells and each said slot having an open end at a lower edge of said side walls;
(ii) a lower edge of said end walls depending below the lower edge of said side walls;
(iii) at least one stiffening rib extending through said cell array generally parallel to said end walls having a lower edge coplanar with the lower edges of said end walls; and
(iv) the openings in said lower face of the cells being located above the lower edges of said end walls and said at least one stiffening rib.

In accordance with a still further aspect of the present invention, a nursery tray is provided having a plurality of cells in a predetermined array with each said cell having an open upper face, cell wall means converging toward a lower face of the cell, and an opening in said lower face of the cell, said nursery tray further having two opposed end walls and two opposed side walls, said tray being characterised by:
(i) said end walls having a plurality of spaced slots with each said slot being aligned with a space between a respective two of said cells and each said slot having an open end at a lower edge of said end walls;
(ii) a lower edge of said side walls depending below the lower edge of said end walls;
(iii) at least one stiffening rib extending through said cell array generally parallel to said side walls having a lower edge coplanar with the lower edges of said side walls, said side walls and said at least one stiffening rib having end regions at their lower edges that are spaced inwardly from said end walls;
(iv) at least one side wall stiffening rib means connecting each said side wall to an adjacent cell wall means intermediate said end walls; and
(v) at least one end wall stiffening rib means connecting each said end wall to an adjacent said cell wall means intermediate said side walls.

In accordance with a variation of the aforementioned still further aspect, the present invention also provides a nursery tray having a plurality of cells in a predetermined array with each said cell having an open upper face, cell wall means converging toward a lower face of the cell, and an opening in said lower face of the cell, said nursery tray further having two opposed end walls and two opposed side walls, said tray being further characterised by:
(i) said side walls having a plurality of spaced slots with each said slot being aligned with a space between a respective two of said cells and each said slot having an open end at a lower edge of said side walls;
(ii) a lower edge of said end walls depending below the lower edge of said side walls;
(iii) at least one stiffening rib extending through said cell array generally parallel to said end walls having a lower edge coplanar with the lower edges of said end walls, said end walls and said at least one stiffening rib having end regions at their lower edges that are spaced inwardly from said end walls;
(iv) at least one side wall stiffening rib means connecting each said side wall to an adjacent cell wall means intermediate said end walls; and
(v) at least one end wall stiffening rib means connecting each said end wall to an adjacent said cell wall means intermediate said side walls.

Preferably an indexing system in accordance with the present invention provides a support means to support at least two nursery trays as aforesaid of said trays adjacent one another in side wall to side wall contact or end wall to end wall contact and an indexing mechanism comprising at least one sprocket wheel arranged to rotate about an axis generally parallel to the plane of said trays with teeth of said sprocket wheel or wheels adapted to engage in said slots whereby said trays are indexed by at least one row of cells in said trays upon rotation of said sprocket wheel or wheels.

Conveniently, an edge of each slot engaged by the sprocket wheel during an indexing movement is reinforced by a web portion extending from the slot edge to a wall of an adjacent cell. Conveniently, each edge of the slots is reinforced by a said web portion connecting the slot edge to an adjacent cell wall.

Conveniently, each cell in the cell array is substantially the same shape and size as every other cell in the array. Preferably each side or end wall of the tray has a depth greater than the depth of the cells whereby the opening in the lower face of the cells is located above the edge of the side and end walls. Preferably at least one longitudinal strengthening web extends between the opposed end walls with the or each longitudinal strengthening web being at least partially formed by aligned cell wall portions. Preferably, at least one transverse strengthening web extends between the opposed side walls with the or each transverse strengthening wall being at least partially formed by aligned cell wall portions. Conveniently, at least one strengthening web portion connects at least some and preferably each cell located adjacent either a side or an end wall with the adjacent side or end wall.

In accordance with another aspect, the present invention provides an arrangement for handling nursery trays during seedling propagation or growing periods, said arrangement comprising at least two spaced generally parallel guide ways, a plurality of individual support members located in each said guide way and capable of being moved there along, each said support member having a raised tray engagement part located above the guideway being adapted to engage with a nursery tray edge formation whereby each said nursery tray is supported without obstructing a lower face of said tray. Conveniently, the edge formations may be edge slots as discussed in the foregoing that are also used for indexing the trays when placed in a transplanting mechanism.

In accordance with still another aspect, the present invention also provides a joint arrangement for use in a modular support system for supporting a plurality of nursery trays in a generally side by side configuration, said joint arrangement comprising a first upright member having an upper end with at least two web flanges arranged at right angles to one another, a first one of said web flanges having an upstanding projection formed from part of the first web flange with a slot formed between the upstanding projection and a second one of said web flanges, a second generally horizontal member having at least two web flanges arranged at right angles to one another with a first one of said web flanges having a first slot formed inwardly from and opening onto a free edge of the first web flange of the second member so as to engage in the slot of said first member, said second member further having a second slot located on a second one of the web flanges which is engagable with a projecting part of the second web flange of the first member, and a third generally horizontal member including a slot engagable with the upstanding projection formed from the first web flange of the first member whereby the second and third members are located generally at right angles to one another when the joint arrangement is assembled. Preferably the third members are guide channels with the slot being formed outwardly of the interior of the channel. Conveniently, at least two guide channels as aforesaid can be located in spaced parallel relationship utilising a number of upright and horizontal members with operating joint arrangements as defined above.

The claims annexed to this specification form a further disclosure of various aspects and features of the present invention and should therefore be regarded as a disclosure forming part of this specification.

THE DRAWINGS

A number of preferred embodiments will hereinafter be described with reference to the accompanying drawings, in which.

DETAILED DESCRIPTION

Figure 1:
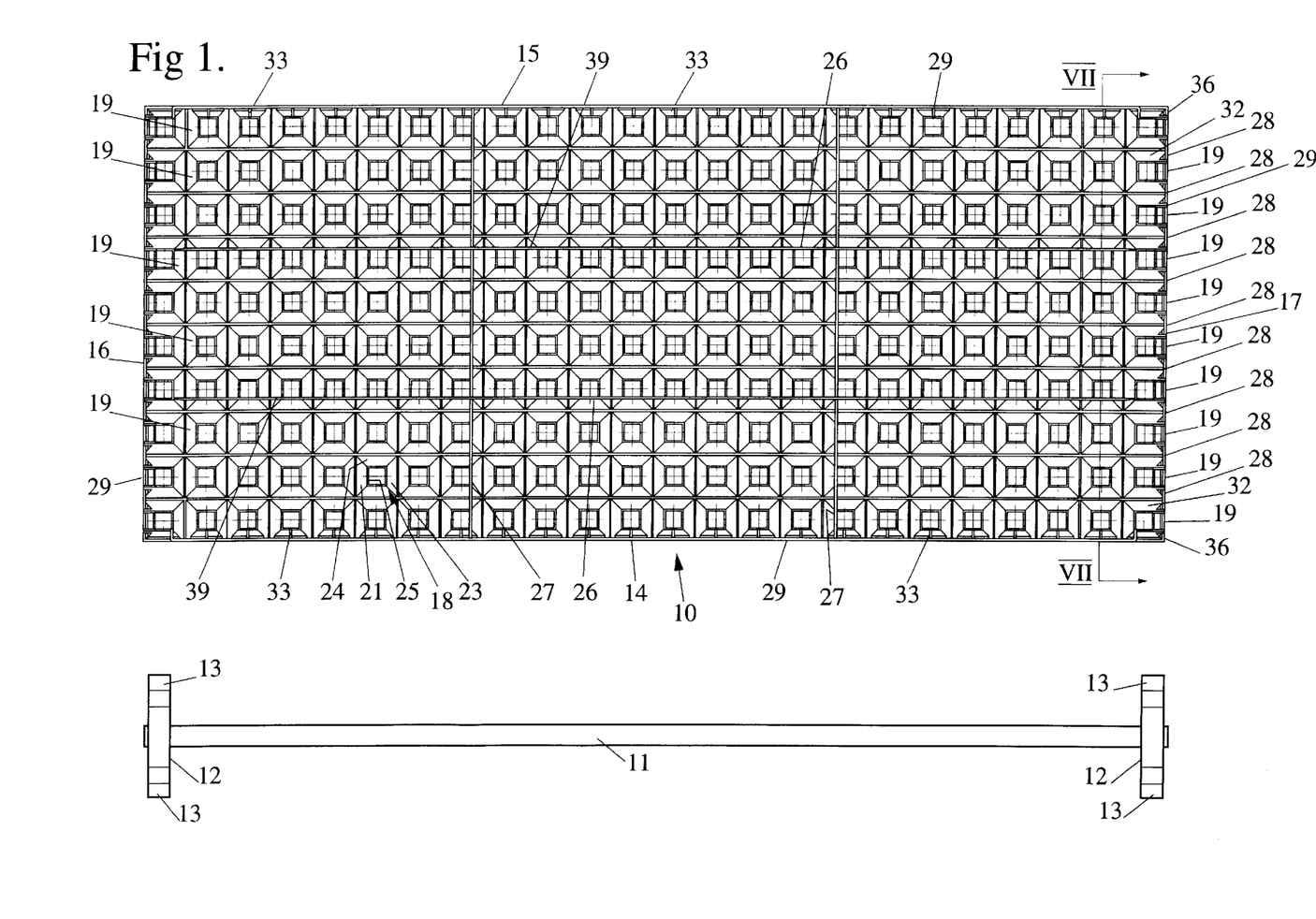
FIG. 1 is a side view of a nursery tray in a vertical indexing position showing the underneath side of the tray with a simple sprocket wheel indexing mechanism.
Figure 3:
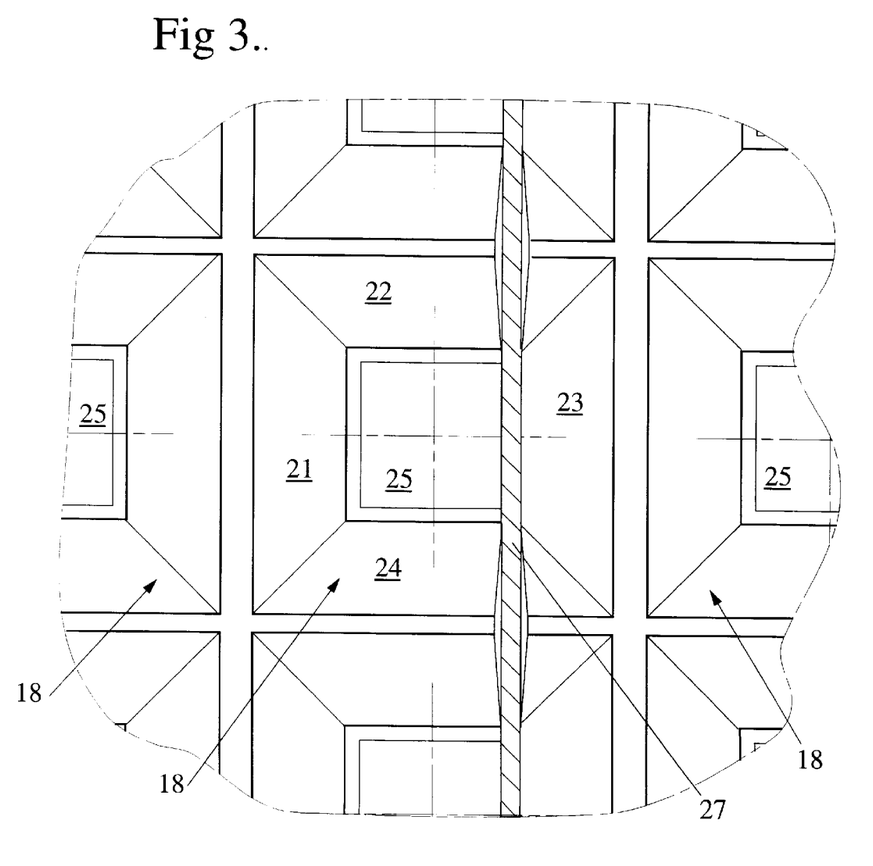
FIG. 3 is a detail view of one part of the underneath view of the tray also showing strengthening ribs blending into cell walls.

Referring now to the drawings, FIG. 1 shows an underneath side of a vertically disposed nursery tray 10 capable of being indexed via an indexing mechanism shown partially at 11 which is in the form of spaced sprocket wheels 12 with sprocket teeth 13 engagable with the tray 10 as described below. The nursery tray comprises a pair of opposed longitudinal side walls 14, 15 and a pair of opposed end walls 16, 17 defining a generally rectangular shape. Each of the side walls 14, 15 have a lower edge 38 whereas the end walls 16, 17 have a lower edge 37. The indexing mechanism may further include guideways to support the laterally spaced end walls 16 whereby at least two and preferably more trays can be supported one above the other with adjacent side walls in contact to move downwardly under gravity towards a seedling transfer device (not shown). Within the side and end walls of the tray 10 there is provided an array of seedling growing cells 18 each of which is generally the same size and shape. The cells 18 are arranged in longitudinally extending rows 19 whereby the indexing mechanism can sequentially present each successive row 19 to the spaced apart seedling transfer device utilised in a transplanting operation. Each cell 18 includes an open upper face 20 and a lower drainage aperture 25 with four walls 21, 22, 23 and 24 converging downwardly from the open face 20 to the lower drainage aperture 25 located in a lower face 37. To provide strength and rigidity to the longitudinal side walls 14, 15, a web 33 is provided between some of and preferably each cell 18 and respective ones of the side walls 14, 15. Preferably, at least one longitudinally extending strengthening web 26 is provided extending between the end walls 16, 17 and at least one further strengthening web 27 (shown in greater detail in FIG. 3) are provided between the side walls 14, 15. Conveniently, at least two such strengthening webs 26 and 27 are provided. It will of course be appreciated that the strengthening webs 26, 27 may be equally spaced and may be increased or decreased in number. Conveniently, each of these webs are similarly formed and are located, as shown, to be formed at least partly by wall sections of the cells so as to achieve desired strength and rigidity without utilising excessive quantities of plastics material. As a result, a strong relatively lightweight tray is produced.

Figure 2:
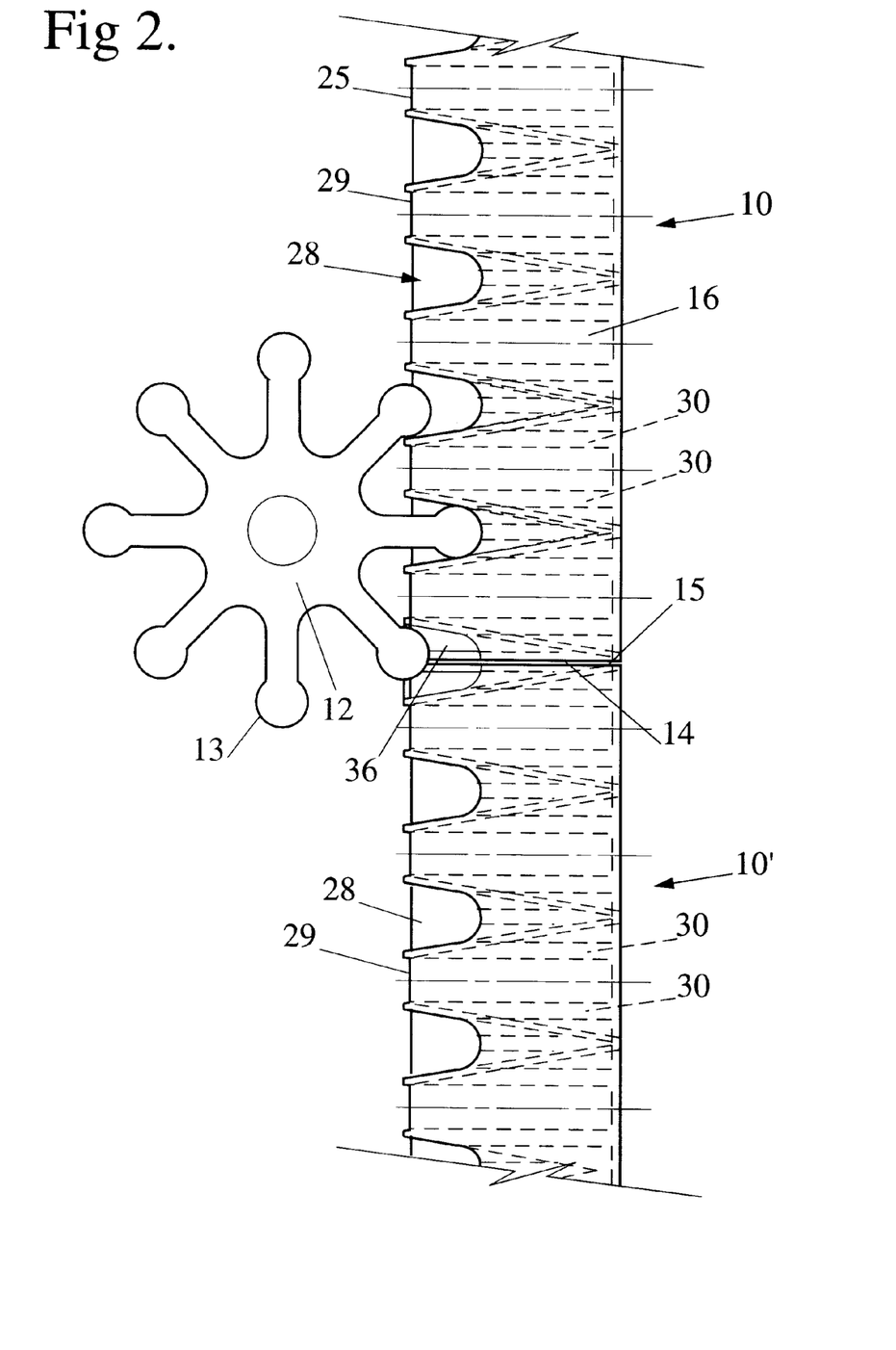
FIG. 2 is an end elevation view showing the co-operation of two nursery trays with the simple sprocket wheel indexing mechanism of FIG. 1.
Figure 4:
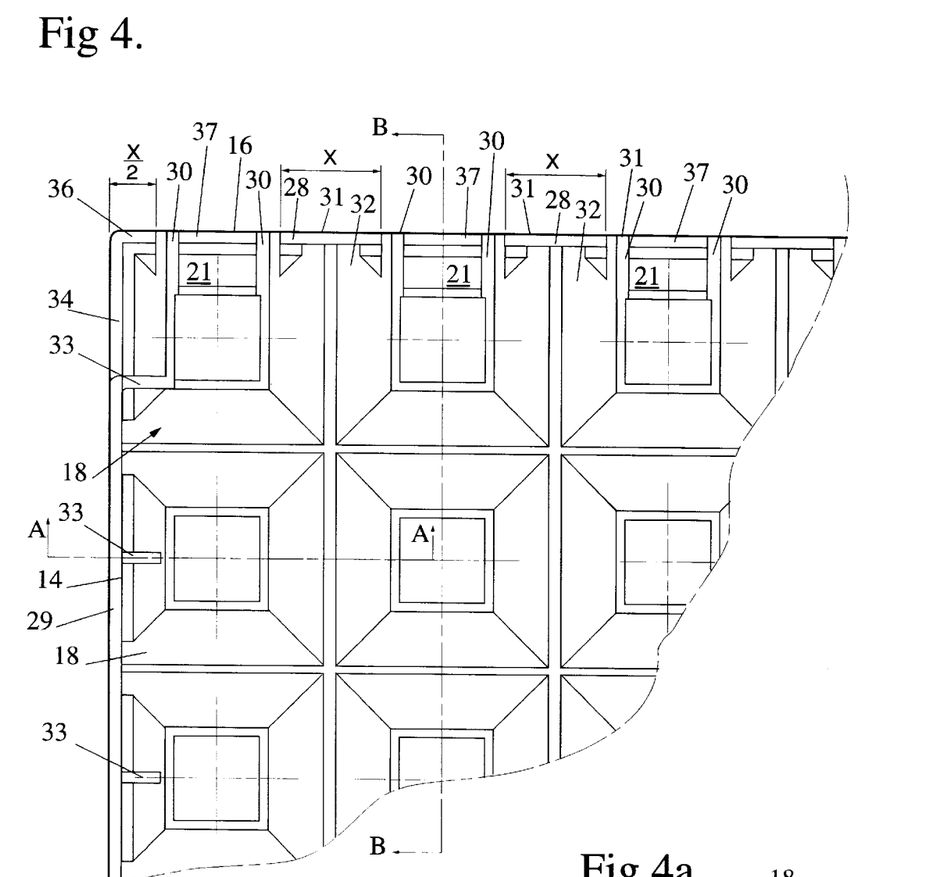
FIG. 4 is a detail of a further portion of the underneath view of the tray also showing the reinforced corner of the tray and an indexing slot being precisely half the width of the full index slots across the tray allowing even index transition tray to tray.
Figure 4A:
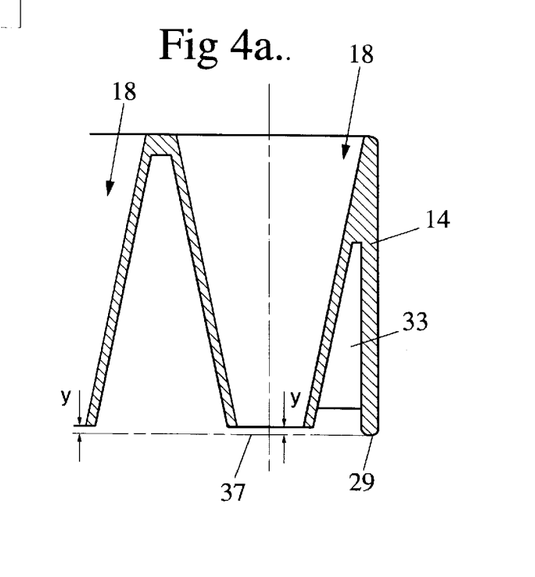
FIG. 4A is a cross-sectional view along line A—A of FIG. 4.
Figure 4B:
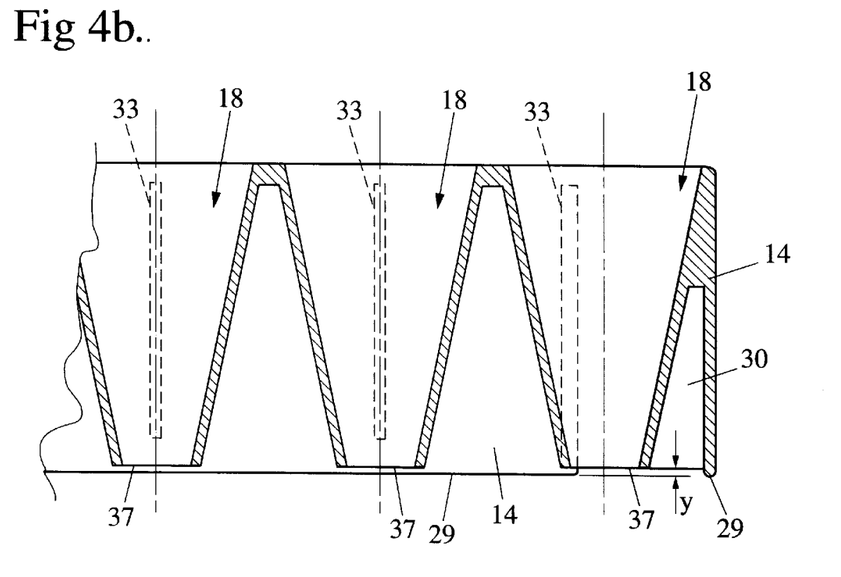
FIG. 4B is a cross-sectional view along line B—B of FIG. 4.
Figure 5:
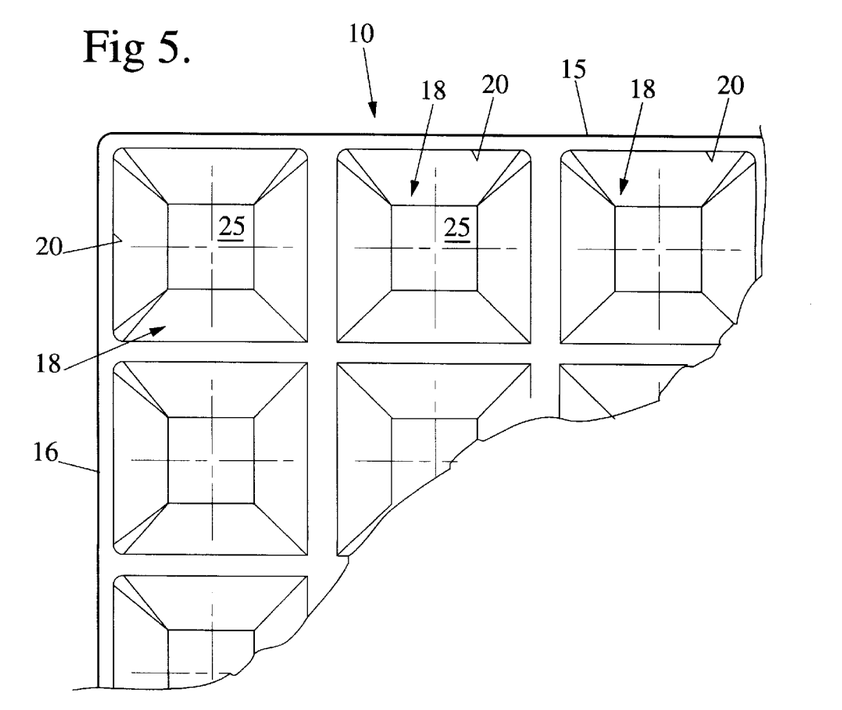
FIG. 5 is a detail view of a corner region of an upper surface of the tray.
Figure 6:
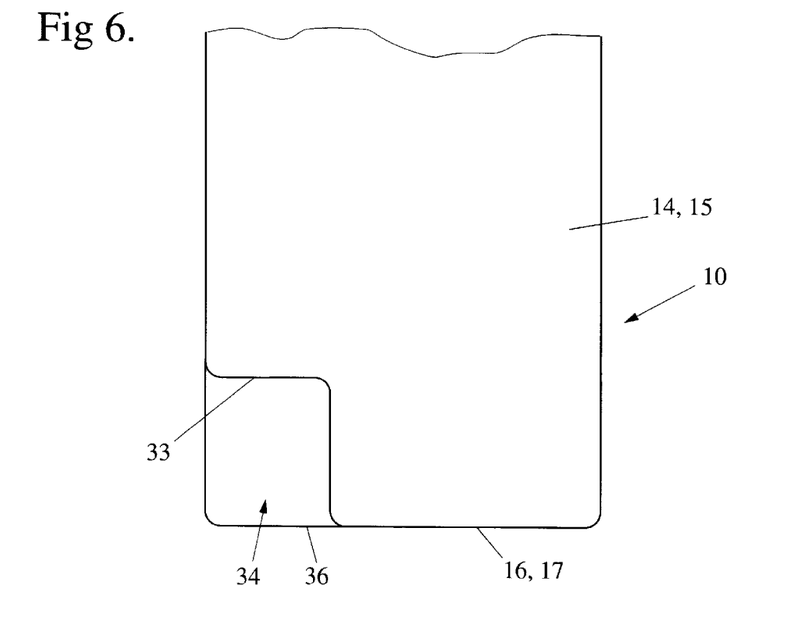
FIG. 6 is a detail of the corner of the longitudinal side wall of the tray.
Figure 7:
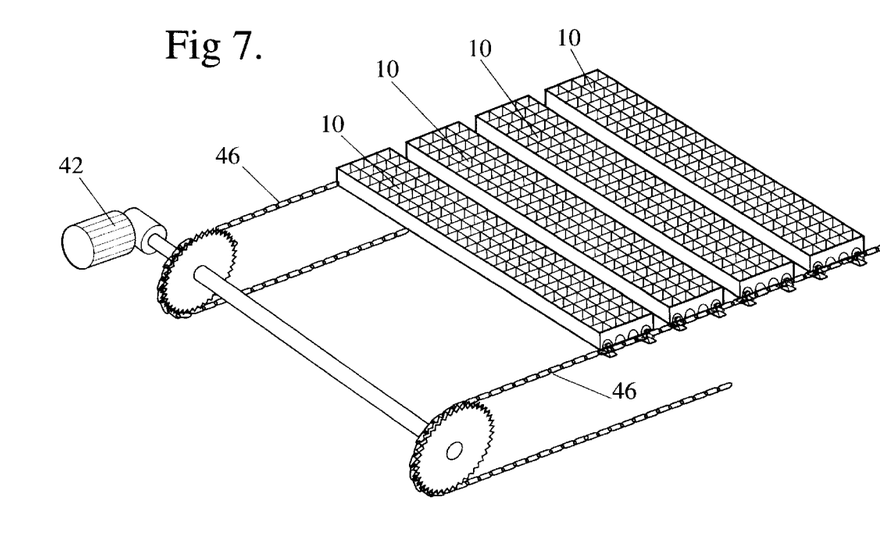
FIG. 7 is a partial and schematic perspective view of apparatus for handling seedlings grown in trays with the trays located adjacent one another.

FIG. 2 of the drawings shows two trays 10,10' with the end wall 16 of one of the trays 10 engaging with the sprocket wheel 12 of the indexing mechanism. The end wall 16 has a plurality of openings or slots 28 each of which opens onto the lower face 37 of the tray on the lower edge 29 of the end wall 16. Each opening 28 is located generally with the space between adjacent cells 18 aligned at the end wall 16. Adjacent each side wall 14, 15 there is a half opening 36 which, together with an adjacent tray provides an effective complete opening 28. As shown in FIG. 2, with two or more trays in side wall contact, a series of evenly spaced openings 28 are provided along the adjacent end walls 16. Similar openings are conveniently formed along the opposed end walls 17. As shown in FIG. 2, preferably the side walls 14, 15 are formed substantially vertically to provide even side wall contact between adjacent trays 10 and 10'. As shown in FIG. 4, an inwardly directed web 30 is provided on at least one side of the openings 28 and preferably on both sides of the openings 28 with each web 30 joining a lateral edge 31 of the opening 28 to the adjacent cell wall 21. By this arrangement, a series of spaces or pockets 32 are provided along the end walls 16, 17 engageable with the sprocket teeth 13 during an indexing operation. Conveniently, each slot or opening 28 has a curved or semi-circular inner end 71 which is adapted to cooperate with a complementary knob formation 70 on an end region of the teeth 13 of the sprocket wheel 12. Preferably, the inner end 71 of the slots 28 extends no more than 50% of the depth of the end walls 16, 17. It will be appreciated that the number and spacing of the pockets 32 can be varied depending on the number and spacing of the sprocket teeth 13 and the indexing control movements of the sprocket wheels 12 whereby rows 19 of cells can sequentially be presented to a transfer mechanism. It is, however, desired that the sprocket wheels can sequentially engage successive trays whereby multiple trays can be indexed as required. As shown in FIGS. 2 and 4A, the side and end walls 14, 15, 16 and 17 are independent of the cells and depend downwardly below the bottom of each cell 18 by a distance y. Similarly, the webs 26 may have a lower edge 39 independent of the cells and depending downwardly to the same depth as the side walls thus generally preventing nesting of the trays when stacked one on the other. The lower edge 39 of the webs 26 is conveniently coplanar with the lower edges 38 of the side walls 14, 15. Moreover, the lower or depending edge 39 of the webs 26 is stopped spaced inwardly from the end walls 16, 17 as are the lower edges 38 of the side walls 14, 15. This arrangement also prevents catching of cell bases when longitudinally sliding the lower tray from under a stack of trays when being fed via a cleated conveyor. As shown in FIG. 6, each corner of the tray includes a cut out section 34 which at each end wall 16, 17 forms the half openings 36. Further reinforcing webs 33, 30 join the end 16, 17 and the side walls 14, 15 to the corner cells 18 to provide added strength to the corners and, in essence, provide a recessed continuation of the tray side and end walls 15, 16.

Figure 8:
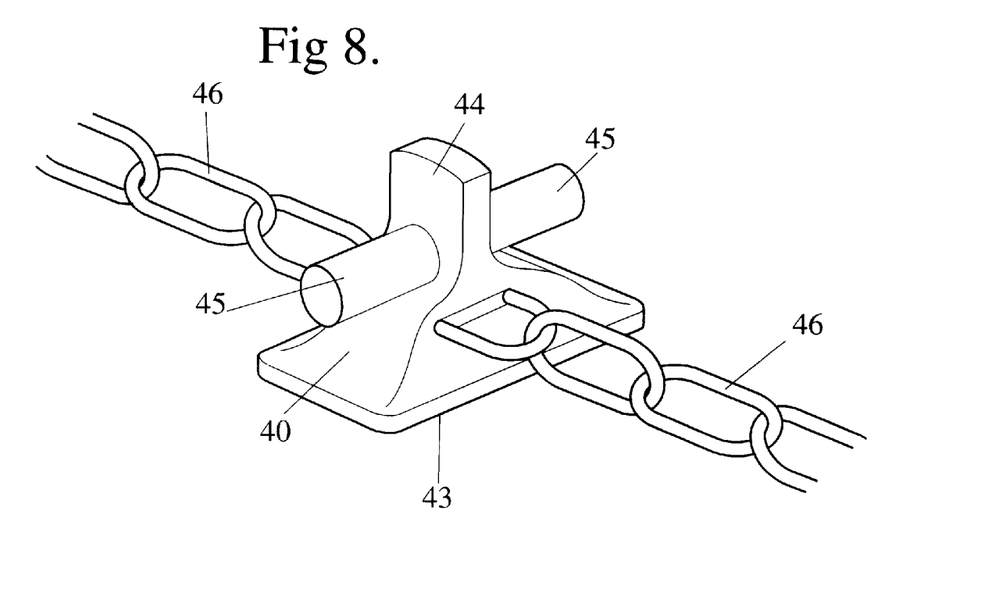
FIG. 8 is a detail perspective view of one tray support member utilised in the apparatus of FIG. 7.
Figure 9:
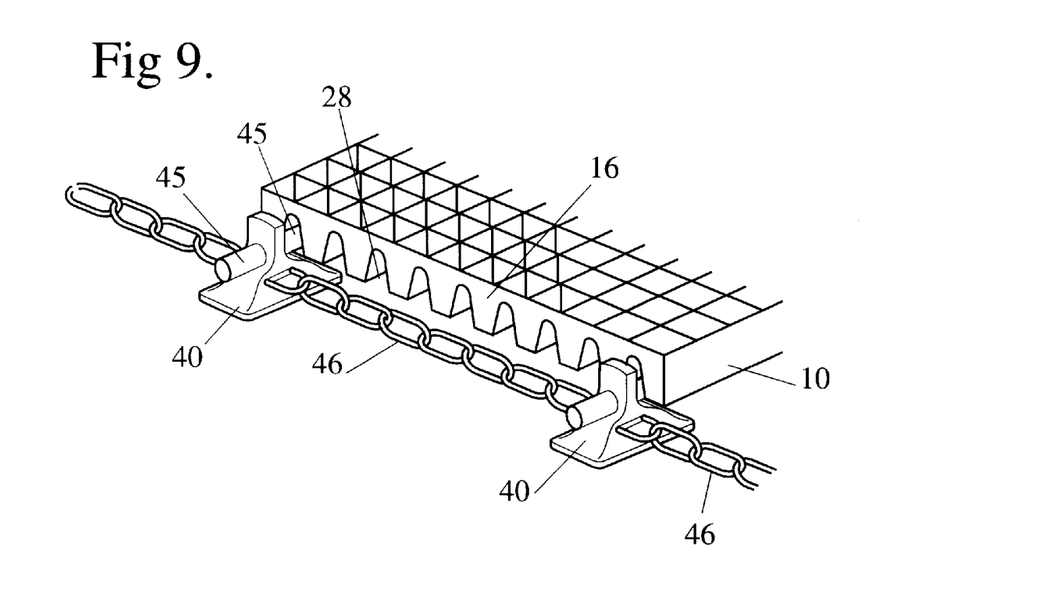
FIG. 9 is a view similar to FIG. 8 where two support members are shown supporting a tray end.
Figure 10:
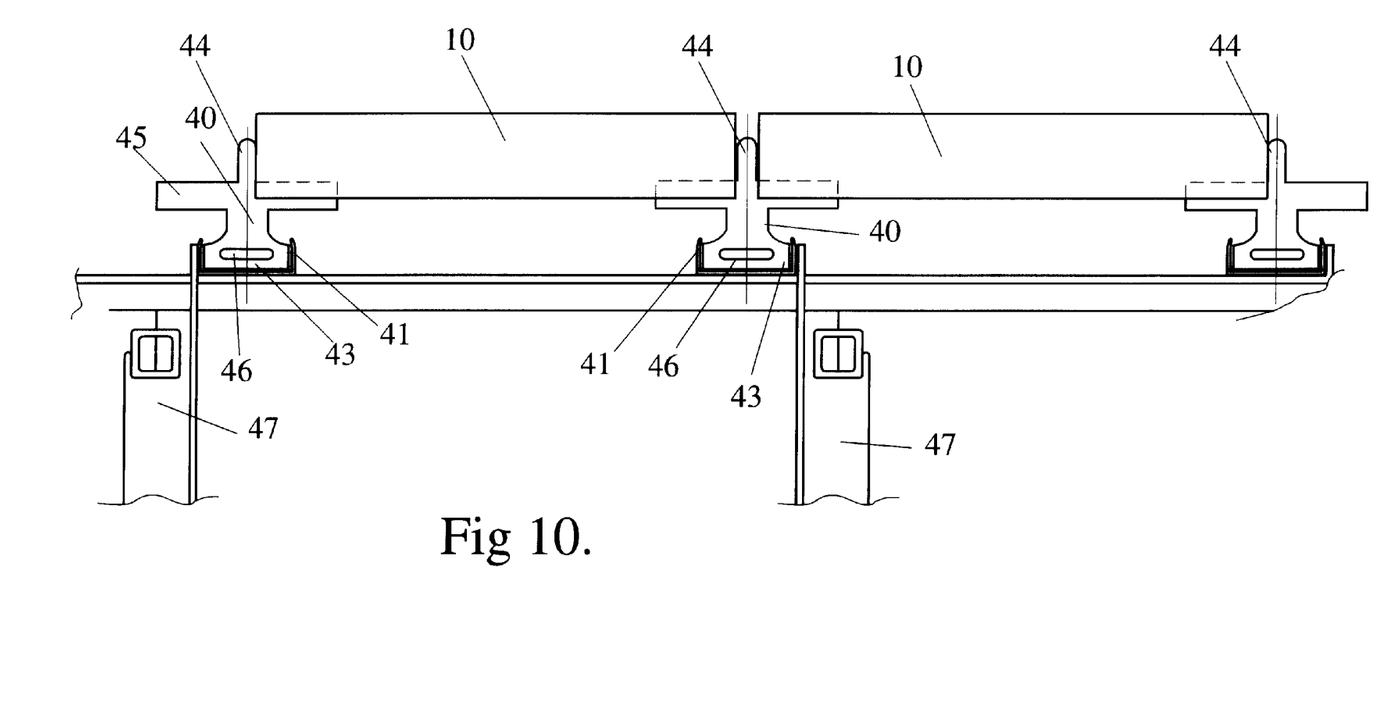
FIG. 10 is an end elevation view of multiple rows of apparatus as shown in FIG. 7 located in side by side relationship.

Reference will now be made to FIGS. 7 to 13 showing aspects of handling nursery trays for movement and/or storage during seed propagation and seedling growth phases. In the illustrated arrangement, a nursery tray 10 is supported on at least a pair of support members 40 located along opposed end edges of the trays (FIGS. 8, 9). Each support member is conveniently supported in a guideway 41 (FIG. 10) which may be a channel like member such that the support members 40 can move along the guideway. Each support member 40 is interlinked by an elongate flexible member 46 such as a chain (or any other suitable member) which forms an endless conveyor means driven by a driving device 42. In one preferred embodiment, the driving device 42 may comprise a gear box with a hollow drive shaft mounted on the shaft and driven by an electric motor. In this way each support member 40 can be moved, when desired, to move the nursery trays. Each support member 40 has a base part 43 moveable in the guideway 41 and an upstanding part 44 which separates adjacent tray ends and prevents longitudinal movement. The support members 40 also have laterally extending pegs 45. Each peg 45 is adapted to engage with an opening 28 in the end wall of a nursery tray to thereby support the trays such that their base regions do not sit on a solid surface such as the guideways 41 thus providing complete aerial pruning evenly to all cells.

Figure 11:
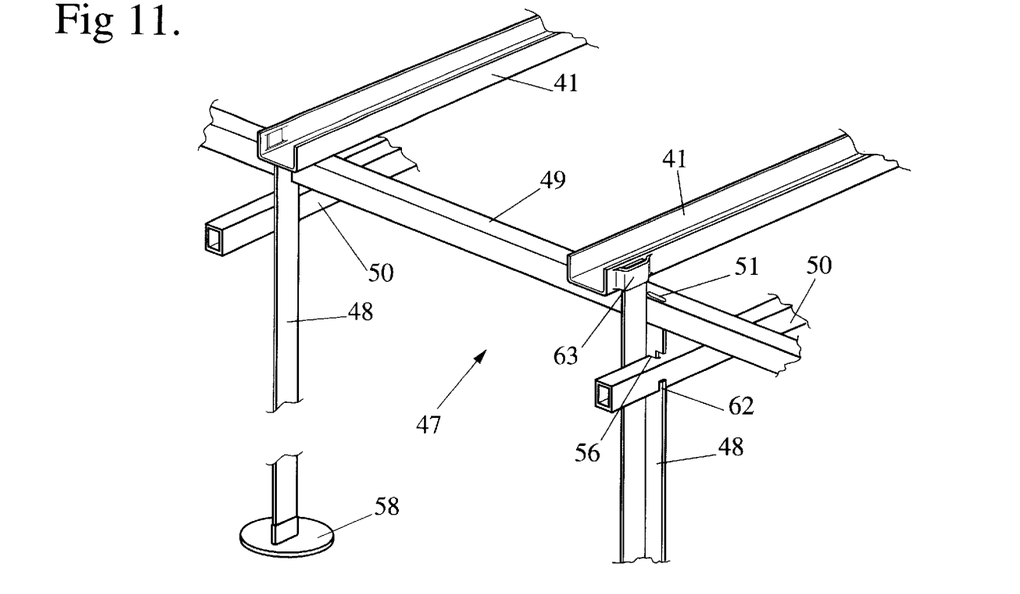
FIG. 11 is a perspective view of modular support apparatus for supporting tray handling apparatus as shown in FIGS. 7 to 10.
Figure 12:
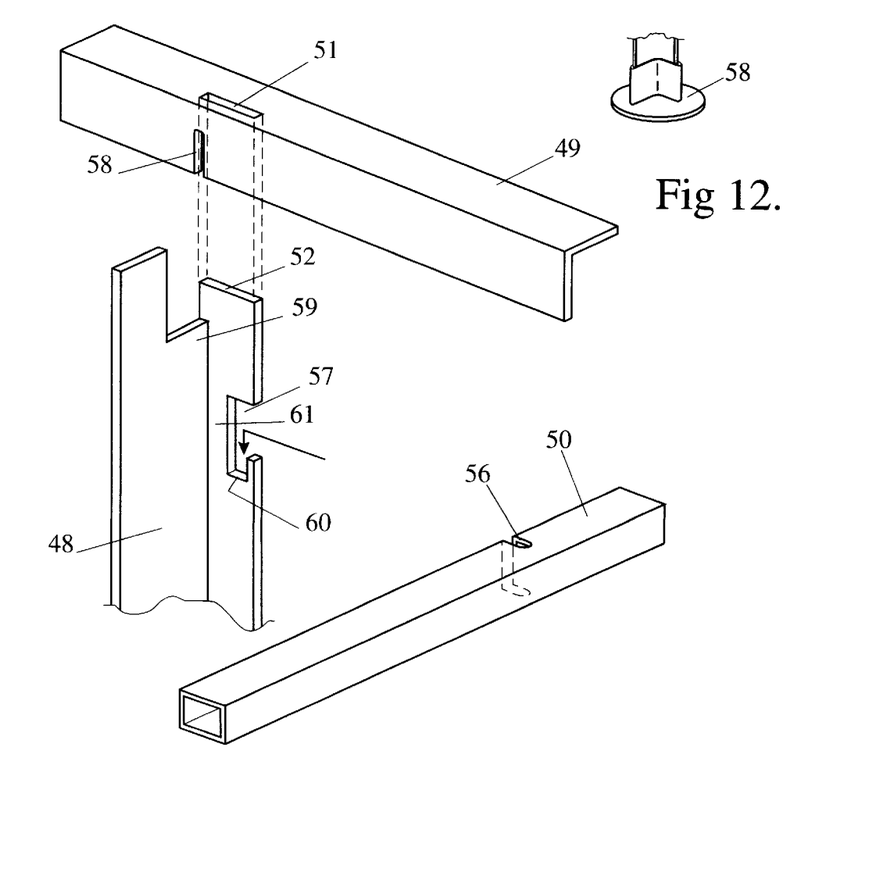
FIGS. 12 and 13 are exploded views of a joint arrangement for use in the support apparatus as shown in FIG. 11.
Figure 13:
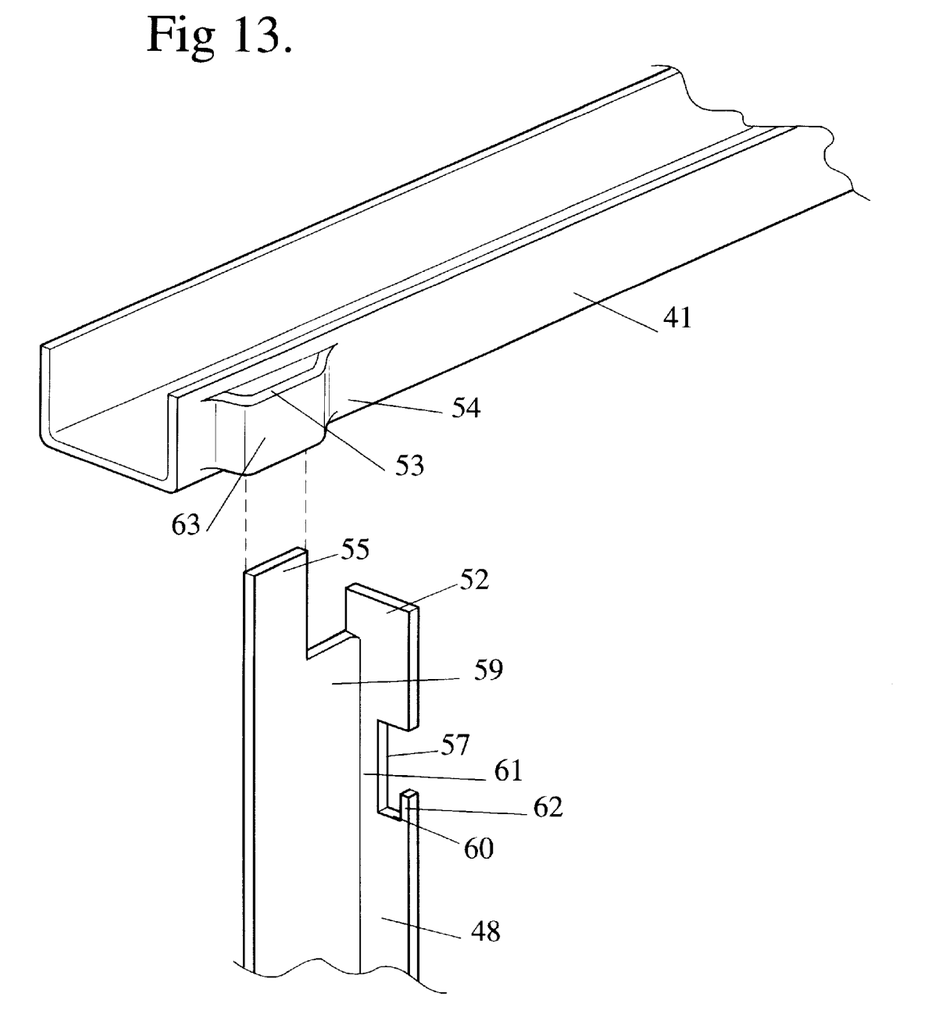

The support structure 47 is conveniently of a modular construction that can be assembled easily and with a minimum of tools. The structure includes a plurality of upright legs 48 with horizontal cross braces 49 and longitudinally extending horizontal braces 50. The horizontal cross bracing members 49 are notched at 51 to receive a tongue 52 on top of the vertical legs 48. In so doing, a slot 58 in the bracing member 49 slips over a portion 59 of the vertical legs 48. At least one of the upright walls 54 of the channel guideways 41 are also notched to form a slot 53 and again a tongue 55 on the top of the legs 48 engages in the slot 53. The slot 53 is conveniently formed by slotting the flange 54 and deforming the portion 63 outwardly. The longitudinal bracing 50 is positioned and secured via a slot 56 engaging in a slot 57 cut out of the vertical legs 48. Once engaged the bracing 50 drops to be supported on the bottom edge 60 of the slot 57 with the slot 56 remaining engaged about the flange portion 61 of the leg 48. This arrangement ensures a stable support structure with the tab 62 retaining the bracing member 50. The framework may predominantly be made of light wall angle iron and light wall square hollow section. The sections may also be aluminium, stainless steel or in a preferred embodiment, galvanised steel to ensure long-term, corrosion free performance in wet conditions. The vertical legs 48 may be inserted into round flat plastics material feet 58 which allow even height control and minimise corrosion of the legs due to wet ground. In some applications, the legs 48 may be set in concrete. Conveniently, the pitch of the chain 46 equals the pitch of the indexing openings 28 on the trays 10 and the moulded support members are spaced optimally to ensure minimal space wastage between trays, both longitudinally and across trays.

The claims defining the invention are as follows:

1. A nursery tray having a plurality of spaced apart cells in a predetermined array with each said cell being adapted to grow a seedling and having an open upper face and an opening in a lower face of the cell, said nursery tray having a pair of opposed side walls and a pair of opposed end walls independent of said cells, said tray being characterised by the walls of at least one pair of said opposed walls being substantially perpendicular to said upper and lower faces and having a plurality of spaced slots each of which is aligned with a space between two of said cells.

2. A nursery tray according to claim 1, wherein the walls of said one pair of opposed walls are the end walls of the tray.

3. A nursery tray according to claim 1, wherein said one pair of opposed walls are the side walls of the tray.

4. A nursery tray according to any one of claims 1, 2, and 3 wherein each of said side walls depends in a direction from the upper face of said cell toward the lower face thereof.

5. A nursery tray according to any one of claims 1, 2, and 3 wherein each of said end walls depends in a direction from the upper face of said cell toward the lower face thereof.

6. A nursery tray according to any one of claims 1, 2, and 3 wherein each of said slots extends into the associated wall from a lower edge thereof.

7. A nursery tray having a plurality of cells in a predetermined array with each cell being adapted to grow a seedling, each said cell having an open upper face and an opening in a lower face of the cell, said nursery tray having two opposed side walls and two opposed end walls independent of said cells, said tray being characterised by at least one of said walls having a plurality of spaced slots each of which is aligned with a space between two of said cells and each slot having an open end at a lower edge of said at least one wall, said end walls being substantially perpendicular to said upper and lower faces of the cells.

8. A nursery tray according to claim 7 wherein said slots are uniformly spaced and located such that when two or more of said nursery trays are positioned adjacent one another, the slots are uniformly spaced along a wall formed by the adjacent said at least one wall of the adjacent trays.

9. A nursery tray according to claim 1 or 7 wherein one of said slots is provided for each said space between adjacent cells.

10. A nursery tray according to claim 1 or 7 wherein a web portion connects an edge region of each said slot with a wall portion of an adjacent cell.

11. A nursery tray according to claim 1 or 7 wherein a web portion connects both edge regions of each said slot with a wall portion of adjacent cells thereby defining a pocket region adapted to be engaged by sprocket teeth of a sprocket wheel indexing mechanism.

12. A nursery tray according to claim 1 or 7 wherein each said cell of said array is substantially the same shape and size as every other cell in said array.

13. A nursery tray according to claim 1 or 7 wherein each of said walls of said tray has a depth such that the openings in the lower faces of the cells are located at a level above that of the corresponding edges of the walls.

14. A nursery tray according to claim 1 or 7 wherein at least one longitudinally extending strengthening web extends in a direction parallel to the side walls each said strengthening web being at least partially formed by aligned cell wall portions of an intermediate aligned group of said cells.

15. A nursery tray according to claim 14 wherein each said longitudinally extending strengthening web has a lower edge located in the same plane as the lower edges of the side walls.

16. A nursery tray according to claim 1 or 7 wherein at least one transversely extending strengthening web extends between the opposed side walls, each said transverse extending strengthening web being at least partially formed by aligned cell wall portions of an intermediate aligned group of said cells.

17. A nursery tray according to claim 1 or 7 wherein a web element connects at least some of the cells located adjacent either a side or an end wall with said adjacent side or end wall.

18. A nursery tray having a plurality of cells in a predetermined array with each said cell having an open upper face, cell wall means converging toward a lower face of the cell, and an opening in said lower face of each said cell, said nursery tray further having two opposed end walls and two opposed side walls, said nursery tray being further characterised by:

(i) said end walls having a plurality of slots with each said slot being aligned with a space between a respective two of said cells and each said slot having an open end at a lower edge of said end walls;

(ii) a lower edge of said side walls depending below the lower edge of said end walls;

(iii) at least one stiffening rib extending through said cell array generally parallel to said side walls having a lower edge coplanar with the lower edges of said side walls; and (iv) the openings in said lower face of the cells being located above the lower edges of said side walls and said at least one stiffening rib.

19. A nursery tray having a plurality of cells in a predetermined array with each said cell having an open upper face, cell wall means converging toward a lower face of the cell, and an opening in said lower face of each said cell, said nursery tray further having two opposed end walls and two opposed side walls, said nursery tray being further characterised by:

(i) said side walls having a plurality of slots with each said slot being aligned with a space between a respective two of said cells and each said slot having an open end at a lower edge of said side walls;

(ii) a lower edge of said end walls depending below the lower edge of said side walls;

(iii) at least one stiffening rib extending through said cell array generally parallel to said end walls having a lower edge coplanar with the lower edges of said end walls; and (iv) the openings in said lower face of the cells being located above the lower edges of said end walls and said at least one stiffening rib.

20. A nursery tray according to claim 18 or claim 19, wherein at least one side wall stiffening rib means connects each said side wall to an adjacent cell wall means intermediate said end walls.

21. A nursery tray according to claim 18 or 19, wherein at least one end wall stiffening rib means connects each said end wall to an adjacent said cell wall means intermediate said side walls.

22. A nursery tray according to claim 18 or 19, wherein said side walls and at least one stiffening rib have end regions at their lower edges that are spaced inwardly from said end walls.

23. A nursery tray having a plurality of cells in a predetermined array with each said cell having an open upper face, cell wall means converging toward a lower face of the cell, and an opening in said lower face of the cell, said nursery tray further having two opposed end walls and two opposed side walls, said tray being characterised by:

(i) said end walls having a plurality of spaced slots with each said slot being aligned with a space between a respective two of said cells and each said slot having an open end at a lower edge of said end walls;

(ii) a lower edge of said side walls depending below the lower edge of said end walls;

(iii) at least one stiffening rib extending through said cell array generally parallel to said side walls having a lower edge coplanar with the lower edges of said side walls, said side walls and said at least one stiffening rib having end regions at their lower edges that are spaced inwardly from said end walls;

(iv) at least one side wall stiffening rib means connecting each said side wall to an adjacent cell wall means intermediate said end walls; and (v) at least one end wall stiffening rib means connecting each said end wall to an adjacent said cell wall means intermediate said side walls.

24. A nursery tray having a plurality of cells in a predetermined array with each said cell having an open upper face, cell wall means converging toward a lower face of the cell, and an opening in said lower face of the cell, said nursery tray further having two opposed end walls and two opposed side walls, said tray being further characterised by:
(i) said side walls having a plurality of spaced slots with each said slot being aligned with a space between a respective two of said cells and each said slot having an open end at a lower edge of said side walls;
(ii) a lower edge of said end walls depending below the lower edge of said side walls;
(iii) at least one stiffening rib extending through said cell array generally parallel to said end walls having a lower edge coplanar with the lower edges of said end walls, said end walls and said at least one stiffening rib having end regions at their lower edges that are spaced inwardly from said end walls;
(iv) at least one side wall stiffening rib means connecting each said side wall to an adjacent cell wall means intermediate said end walls; and
(v) at least one end wall stiffening rib means connecting each said end wall to an adjacent said cell wall means intermediate said side walls.

25. A nursery tray according to claim 23 or claim 24, wherein a said side wall stiffening rib means connects the cell wall means of each cell adjacent to the respective side wall.

26. A nursery tray according claim 23 or 24, wherein a said end wall stiffening rib means connects the cell wall means of each said cell adjacent to the respective end wall with said end wall stiffening rib means also being located adjacent a said slot.

27. A nursery tray according to claim 23 or 24, wherein at least two said stiffening ribs are provided at spaced locations.

28. An indexing system according to claim 27, wherein a pair of spaced sprocket wheels are provided, each said sprocket wheel having teeth adapted to engage said slots located on opposed sides of a said tray.

29. An indexing mechanism according to claim 28, wherein the teeth of each said sprocket wheel have curved end portions complementary to curved upper end portions of the slots.

30. A nursery tray according to claim 23 or claim 24, or any claim dependent directly or indirectly from claim 16 or claim 21, further including at least one stiffening rib extending between and connected to said side walls, the or each said stiffening rib extending between said side walls having a lower edge located above the lower edges of said side walls.

31. A nursery tray according to claim 23 or 24, wherein the or each of said stiffening ribs are at least partially formed by aligned cell wall means.

32. A nursery tray according to claim 23 or 24, wherein each said slot has an upper curved end merging into downwardly diverging side walls.

33. A nursery tray according to claim 32, wherein the curved ends of said slots are adapted to engage with complementary curved end portions of teeth of an indexing sprocket wheel.

34. A nursery tray according to claim 23 or 24 wherein the height of each said slot is less than 50% of the height of the end walls.

35. An indexing system comprising a support means to support at least two nursery trays according to any one of claims 1, 7, 18, 19, 23, or 24 adjacent one another in side wall to side wall contact or end wall to end wall contact and an indexing mechanism comprising at least one sprocket wheel arranged to rotate about an axis generally parallel to the plane of said trays with teeth of said sprocket wheel adapted to engage in said slots whereby said trays are indexed by at least one row of cells in said trays upon rotation of said sprocket wheel.

36. A nursery tray having a plurality of spaced apart cells in a predetermined array with each cell being adapted to grow a seedling, each said cell having an open upper face and an opening in a lower face of said cell, said nursery tray having at each of two opposite sides thereof a wall independent of said cells, each said wall depending from the upper face and being perpendicular to the lower face of each said cell, at least one of said walls having a plurality of spaced slots each of which is aligned with a space between two of said cells.

37. The nursery tray according to claim 36 wherein each of said slots extends into said one of said walls from a lower edge thereof.

* * * * *

UNITED STATES PATENT AND TRADEMARK OFFICE
CERTIFICATE OF CORRECTION

PATENT NO. : 6,237,286 B1
DATED : May 29, 2001
INVENTOR(S) : Geoffrey Allan Williames It is certified that error appears in the above-identified patent and that said Letters Patent is hereby corrected as shown below:

Column 6,
Line 46, after "of" (second occurrence), insert -- spaced apart --;
Lines 50 and 51, cancel "spaced apart".

Column 7,
Line 10, change "located" to -- aligned --;
Line 11, change "aligned" to -- located --;
Line 43, after "39" insert -- are --;
Line 47, change "is" to -- are --;
Line 49, change "is" to -- are --.

Column 12,
Line 1, cancel "claim" (second occurrence);
Lines 1-3, cancel ", or any claim dependent directly or indirectly from claim 16 or claim 21".

Signed and Sealed this

Sixth Day of August, 2002

Attest:

JAMES E. ROGAN
*Attesting Officer*   *Director of the United States Patent and Trademark Office*